(12) United States Patent
Roh et al.

(10) Patent No.: US 7,760,597 B2
(45) Date of Patent: Jul. 20, 2010

(54) OPTIMAL RECORDING APPARATUS AND METHOD FOR DETERMINING AN OPTICAL RECORDING CONDITION

(75) Inventors: Jin-Tae Roh, Kyounggi-do (KR); Bok-Hyun Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 1118 days.

(21) Appl. No.: 11/354,106

(22) Filed: Feb. 15, 2006

(65) Prior Publication Data

US 2006/0126467 A1    Jun. 15, 2006

Related U.S. Application Data

(63) Continuation of application No. 09/664,364, filed on Sep. 18, 2000, now Pat. No. 7,170,835.

(30) Foreign Application Priority Data

Sep. 18, 1999    (KR) ............................... 40304/1999

(51) Int. Cl.
*G11B 7/00* (2006.01)

(52) U.S. Cl. .................................. 369/47.53

(58) Field of Classification Search ............... 369/47.1, 369/47.5, 47.51, 47.52, 47.53, 116, 120, 369/121, 122, 47.27
See application file for complete search history.

(56) References Cited

U.S. PATENT DOCUMENTS

| | | | |
|---|---|---|---|
| 5,463,600 A * | 10/1995 | Kirino et al. | 369/13.24 |
| 5,544,137 A | 8/1996 | Ohara et al. | |
| 5,559,785 A | 9/1996 | Honda et al. | |
| 5,663,942 A | 9/1997 | Ishibashi et al. | |
| 5,732,061 A | 3/1998 | Kirino et al. | |
| 5,737,289 A | 4/1998 | Udagawa | |
| 5,745,467 A | 4/1998 | Sakaue et al. | |
| 5,748,584 A | 5/1998 | Maezawa | |

(Continued)

FOREIGN PATENT DOCUMENTS

JP    05-144004    11/1993

(Continued)

*Primary Examiner*—Nabil Z Hindi
(74) *Attorney, Agent, or Firm*—Birch, Stewart, Kolasch & Birch, LLP

(57) ABSTRACT

An optimal recording apparatus and method for optical recording media are disclosed which are capable of recording data on the optical recording medium under optimum conditions in an optical recording/reproducing apparatus.

In accordance with the optimal recording apparatus and method, a reference power value recorded on an optical recording medium is first read out. Test data is then recorded onto a first field of a test data in the optical recording medium under a condition in which a recording power value is varied with reference to the read power value. The test data recorded on the first field is subsequently reproduced in order to determine an optimum recording power value from the reproduced characteristics. Based on the determined optimum recording power value, test data is recorded on a second field of the test area under a condition in which a format of recording signals is varied. The test data recorded on the second field is subsequently reproduced in order to determine an optimum write strategy. Desired data is then recorded on the optical recording medium, using the determined optimum write strategy and the determined recording power value.

11 Claims, 9 Drawing Sheets

U.S. PATENT DOCUMENTS

| | | |
|---|---|---|
| 5,872,763 A | 2/1999 | Osakabe |
| 5,974,021 A | 10/1999 | Toda et al. |
| 5,978,351 A | 11/1999 | Spruit et al. |
| 6,100,724 A | 8/2000 | Yoshimura et al. |
| 6,172,951 B1 | 1/2001 | Ohba |
| 6,292,448 B1 | 9/2001 | Yoshida et al. |
| 6,404,712 B1 | 6/2002 | Lee et al. |
| 6,639,890 B1 | 10/2003 | Miura et al. |
| 6,646,965 B1 * | 11/2003 | Kim ................... 369/47.53 |
| 6,775,218 B1 | 8/2004 | O'Neill et al. |
| 6,813,107 B1 | 11/2004 | Lee |
| 6,859,426 B1 | 2/2005 | Ogawa et al. |

FOREIGN PATENT DOCUMENTS

| | | |
|---|---|---|
| JP | 07-287847 | 10/1995 |
| JP | 3057875 | 10/1999 |
| WO | WO 01/15148 | 3/2001 |

\* cited by examiner

'Minute' Byte when M1 : S1 : F1 = 101

| W1,W2,W3 | = 000 | ---▶ | $P_{ind}$ = 5mw |
|---|---|---|---|
| | = 001 | ---▶ | $P_{ind}$ = 6mw |
| | = 010 | ---▶ | $P_{ind}$ = 7mw |
| | = 011 | ---▶ | $P_{ind}$ = 8mw |
| | = 100 | ---▶ | $P_{ind}$ = 9mw |
| | = 101 | ---▶ | $P_{ind}$ = 10mw |
| | = 110 | ---▶ | $P_{ind}$ = 11mw |
| | = 111 | ---▶ | $P_{ind}$ = 12mw |

{ W1,W2,W3 : Indicative Target Writing Power($P_{ind}$)
X1 : Reserved Future Extensions(=0)
V1, V2, V3 : Reference Speed 'Second' Byte when M1 : S1 : F1 = 001

$\left\{\begin{array}{l}\text{P1,P2,P3} \\ \text{G1,G2,G3} \\ \text{Y1}\end{array}\right.$ : β-range category
: Optimum write strategy
: Reserved for future extentions(=0)

P1,P2,P3 = 000 : low β category(−) (−4~+8%)
= 001 : high β category(+) (0~+12%)
= others : Reserved G1,G2,G3 = 000 : type A medium
= 001 : type B medium
= 010 : type C medium
= others : Reserved X : Modulation degrees calculated in accordance with the conventional method(15 in number)
O : Modulation degrees calculated in accordance with the conventional method(5 in number)

Fig. 12

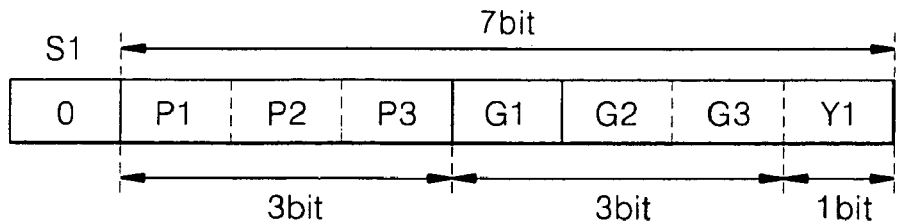

'Second' Byte when M1 : S1 : F1 = 001

$\begin{cases} P1, P2, P3 & : \text{Power multiplication factor } \rho \text{ at reference speed} \\ G1, G2, G3 & : \text{Target } r \text{ value of the modulation/power function for all speeds} \\ Y1 & : \text{Reserved for future extentions}(=0000) \end{cases}$

Fig. 13

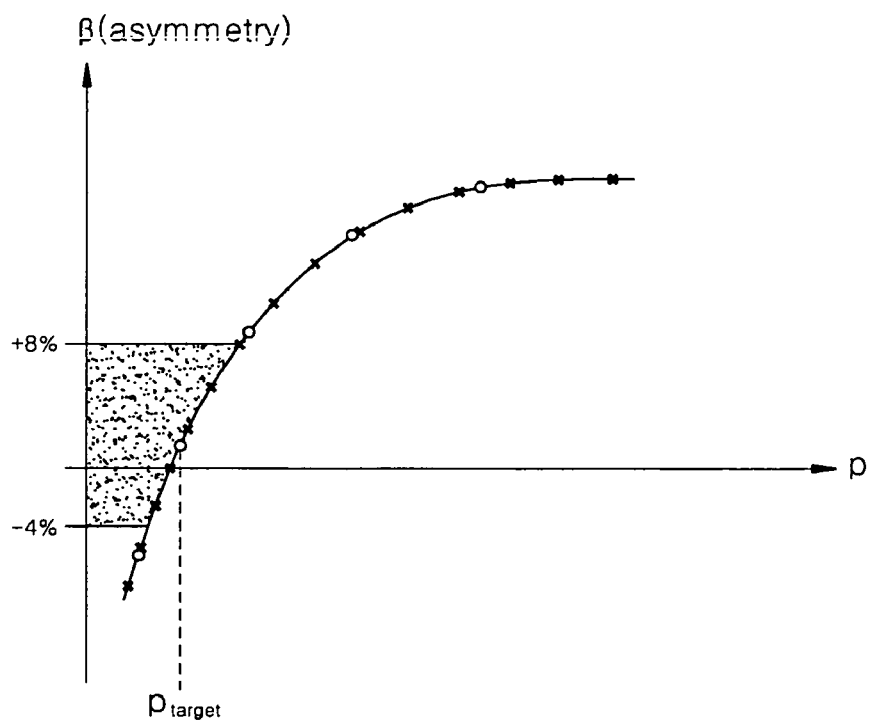

X : Modulation degrees calculated in accordance with the conventional method(15 in number)
O : Modulation degrees calculated in accordance with the conventional method(5 in number)

OPTIMAL RECORDING APPARATUS AND METHOD FOR DETERMINING AN OPTICAL RECORDING CONDITION

This application claims the benefit of the Korean Patent Application No. 1999-40304, filed on Sep. 18, 1999, which is hereby incorporated by reference as if fully set forth herein. This application is also a Continuation of application Ser. No. 09/664,364, filed on Sep. 18, 2000, now U.S. Pat. No. 7,170,835 the entire contents of which are hereby incorporated by reference and for which priority is claimed under 35 U.S.C. §120.

BACKGROUND OF THE INVENTION

1. Field of the Invention

The present invention relates to an optimal recording apparatus and method for optical recording media.

In particular, the present invention relates to an optimal recording apparatus and method for optical recording media which are capable of identifying a write strategy for an optimal recording of data on an optical recording medium, thereby allowing the identified write strategy to be utilized for a subsequent recording of data on the optical recording medium.

2. Description of the Conventional Art

FIG. 1 illustrates the configuration of a conventional optical recording/reproducing apparatus for recording data on an optical recording medium and reproducing the recorded data.

As shown in FIG. 1, this optical recording/reproducing apparatus includes a digital recording signal processing unit 30a for adding an error correction code (ECC) to input digital data, thereby converting the input digital data into a recording format, a channel bit encoder unit 40 for reconverting the data, converted into the recording format, into a bit stream, an optical driver unit 50 for outputting a light amount drive signal, an optical pick-up unit 11 for recording a desired signal onto an optical recording medium 10 in accordance with the light amount drive signal, and detecting a recording signal from the optical recording medium 10, and a drive unit 80 for driving the optical pick-up unit 11 and a motor M. The optical recording/reproducing apparatus further includes an R/F unit 60 for filtering a signal detected by the optical pick-up unit 11, conducting a waveform shaping for the filtered signal, and converting the resultant signal into a binary signal, a servo unit 70 for controlling the driving of the drive unit 80, based on signals indicative of tracking errors and focusing errors generated in the optical pick-up unit 11, along with the rotating speed of the optical recording medium 10, a digital reproduced signal processing unit 30b for recovering the binary signal into original data at a clock synchronizing with the binary signal, and a microcomputer 100 for controlling the recording/reproducing procedure.

Now, an operation of the conventional optical recording/reproducing apparatus will be described in conjunction with FIG. 1.

When a data recording request is inputted to the microcomputer 100 under the condition in which an optical recording medium 10 is loaded in a tray not shown, the optical recording/reproducing apparatus conducts an optimal power calibration (OPC).

In accordance with the OPC procedure, the microcomputer 100 controls the servo unit 70 and the drive unit 80 prior to recording of input data. In accordance with controlled operations of the servo unit 70 and drive unit 80, the optical pick-up unit 11 is controlled to read out a target writing power value $P_{ind}$ recorded in the form of 3-bit data W1, W2, and W3. FIG. 2 illustrates an example of the target writing power value recorded in the form of 3-bit data on the optical recording medium 10.

The microcomputer 100 then applies an adjustment signal to the optical driver unit 50 in a variable fashion. The adjustment signal is adapted to vary an optical power with reference to the read target recording power value, for example, 8 mW. FIG. 3 illustrates a variation in optical power with reference to a target recording power value. The optical driver unit 50 outputs a recording signal for test data at an optical drive power corresponding to the adjustment signal. In accordance with the recording signal, the optical pick-up unit 11 records test data onto a test recording area of the optical recording medium 10. FIG. 4 illustrates a recording signal test area A in a re-writable optical recording medium (CD-RW), along with a count area B for recording the number of test times.

The microcomputer 100 controls the pick-up unit 11 in a state, in which test data is recorded on the test area A of the optical recording medium 10, as shown in FIG. 4, in order to sequentially read out test data recorded several times. Each of the test data sequentially read is applied to the R/F unit 60 which, in turn, conducts a filtering and a waveform shaping for the test data, thereby reproducing that test data. FIG. 5 illustrates a reproduced signal for the test data recorded on the optical recording medium.

The microcomputer 100 then calculates the degree of modulation, based on the reproduced signal, and estimates a polynomial expression for a modulation degree curve (m=f(p)), using a curve filtering.

The modulation degree m corresponds to a value of $I_{11T}/I_{TOP}$ (m=$I_{11T}/I_{TOP}$). Here, "$I_{11T}$" represents the amplitude of the reproduced signal for an 11T signal, and "$I_{TOP}$" represents a peak value of the 11T signal.

Next, a γ curve is derived using the estimated modulation degree curve "m=f(p)".

FIG. 6 illustrates a modulation degree curve "m=f(p)" and a γ curve "γ=g(p)" for detecting an optimum recording power value. Here, an expression "γ=p/m×f'(p)" is established.

Also, the value of a target γ recorded on the optical recording medium 10 is read out. Based on the read target γ value, an optimum optical power is derived.

The microcomputer 100 controls the optical driver unit 50 to output, for the input data, a recording signal according to the optimum optical drive power detected in the above mentioned procedure. The optical drive unit 50 applies, to the optical pick-up unit 11, the recording signal according to the optical drive power, thereby allowing a pulse-width-modulated signal to be recorded onto a program area of the optical recording medium 10.

The microcomputer 100 also determines the format of the recording signal, that is, the pulse level and width of the recording signal, upon recording the input data, based on a write strategy recorded on the optical recording medium 10. FIG. 7 illustrates the optimum write strategy recorded on the optical recording medium 10. The data write strategy is recorded on the optical recording medium 10 in the form of a fixed value in the manufacture of the optical recording medium 10.

In the case of a once-writable optical recording medium, the data write strategy thereof has a value β, indicative of a signal non-linearity, fixed in accordance with the type of the recording medium. In the case of a re-writable optical recording medium, the data write strategy thereof has a value β fixed in accordance with the record speed of the recording medium. Accordingly, the input data is recorded onto the optical recording medium 10 after being converted into a recording signal, that is, recording pulses, at the calculated optimum recording power, based on the recording signal format.

As apparent from the above description, the write strategy recorded on an optical recording medium is an absolute value for the recording medium.

This means that the write strategy for an optical recording medium is set without taking into consideration the optical recorder used to record data onto the recording medium.

Meanwhile, recorders of different types may exhibit different recording circuit characteristics. Even in recorders of the same type, they may exhibit different recording circuit characteristics in accordance with different manufacturers thereof. For this reason, there are frequent occasions that although a request is made to record data on a recording medium in accordance with the write strategy set in the recording medium, that is, a pulse width and peak level set for one pit, it is impossible to output desired data having a signal format completely identical to the signal format set in the recording medium.

Nevertheless, in accordance with the conventional optimal data recording method, the recording of data corresponding to the signal format set in a recording medium is conducted, only based on an optimum recording power detected from the recording medium. For this reason, it may be impossible to record data on a recording medium under optimum recording conditions for the recording medium. Where signals recorded in such a state are reproduced, the resultant reproduced signals exhibit a jitter exceeding a tolerable range. Thus, there may be a degradation in the reproduction characteristics of recording data.

SUMMARY OF THE INVENTION

Therefore, an object of the invention is to provide an optimal recording apparatus and method for optical recording media which are capable of recording data on an optical recording medium under optimum recording conditions, thereby achieving an improvement in the reproduction characteristics of recording data.

In accordance with one aspect, the present invention provides an optimal recording apparatus for optical recording media comprising: recording means for recording optional data, as test data, onto a test area of an optical recording medium while varying a format of recording signals; reproduction means for reproducing the test data; jitter measuring means for measuring respective jitters of reproduced signals outputted from the reproduction means; and control means for determining an optimum write strategy, based on the measured jitters.

In accordance with another aspect, the present invention provides an optimal recording method for optical recording media comprising the steps of: (a) reading out a reference power value recorded on an optical recording medium; (b) recording optional data, as test data, onto a first field of a test area in the optical recording medium while varying a recording power value with reference to the read reference power; (c) reproducing the test data recorded on the first field, thereby determining an optimum recording power value, based on characteristics of the resultant reproduced signals; (d) recording optional data, as test data, onto the test area while varying a format of recording signals, using the determined optimum recording power value; and (e) reproducing the test data, recorded in accordance with the varied recording signal format, determining an optimum recording strategy based on characteristics of the resultant reproduced signals, and storing the optimum recording strategy.

In accordance with the present invention, test data is recorded on the test area of an optical recording medium. The recorded test data is subsequently reproduced to detect an optimum power from the reproduction characteristics. In accordance with the present invention, test data is also recorded under a condition in which a format of recording signals is varied.

At least two variables for determining an optimum recording condition are determined, based on the test data recorded under the condition in which the recording signal format is varied. The determined variables are used for the next recording of data in order to minimize the jitter of reproduced signals.

Thus, it is possible to record data on an optical recording medium under optimum recording conditions, thereby achieving an improvement in the reproduction characteristics of recording data in accordance with the present invention.

BRIEF DESCRIPTION OF THE DRAWINGS

The above objects, and other features and advantages of the present invention will become more apparent after a reading of the following detailed description when taken in conjunction with the drawings, in which:

FIG. 12 is a diagram illustrating a data format for $\gamma$ and $\rho$ values recorded on the optical recording medium;

FIG. 13 is a graph illustrating a $\beta$ curve for detecting an optimum recording power value associated with a re-writable optical recording medium in accordance with the present invention.

DESCRIPTION OF THE PREFERRED EMBODIMENTS

Now, preferred embodiments of an optimal recording apparatus and method for optical recording media in accordance with the present invention will be described.

Figure 8:
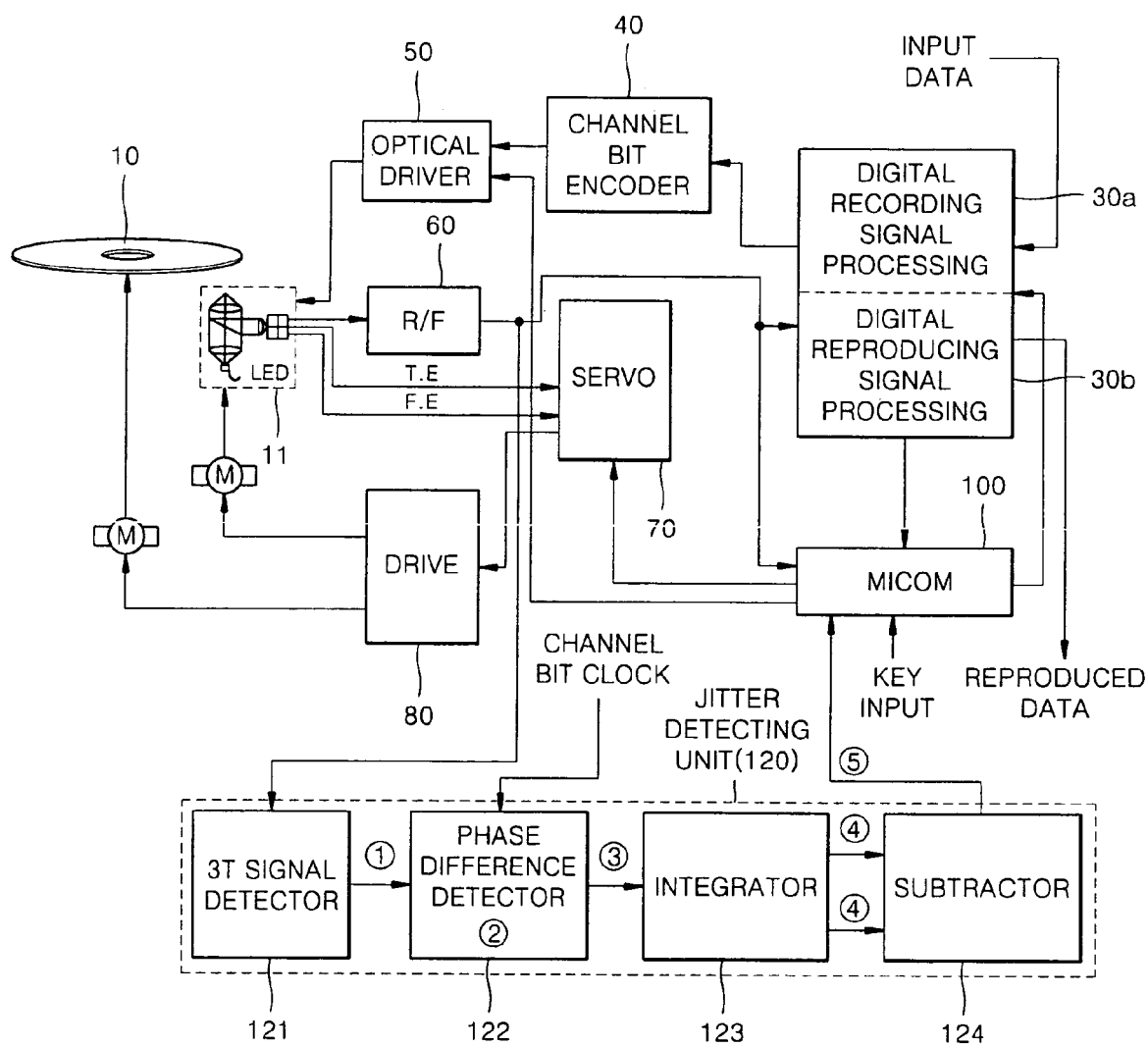
FIG. 8 is a block diagram illustrating an optical recording/reproducing apparatus in which an optimal recording apparatus for optical recording media in accordance with an embodiment of the present invention is implemented.

FIG. 8 is a block diagram illustrating an optical recording/reproducing apparatus in which an optimal recording apparatus for optical recording media in accordance with an embodiment of the present invention is implemented.

Figure 1:
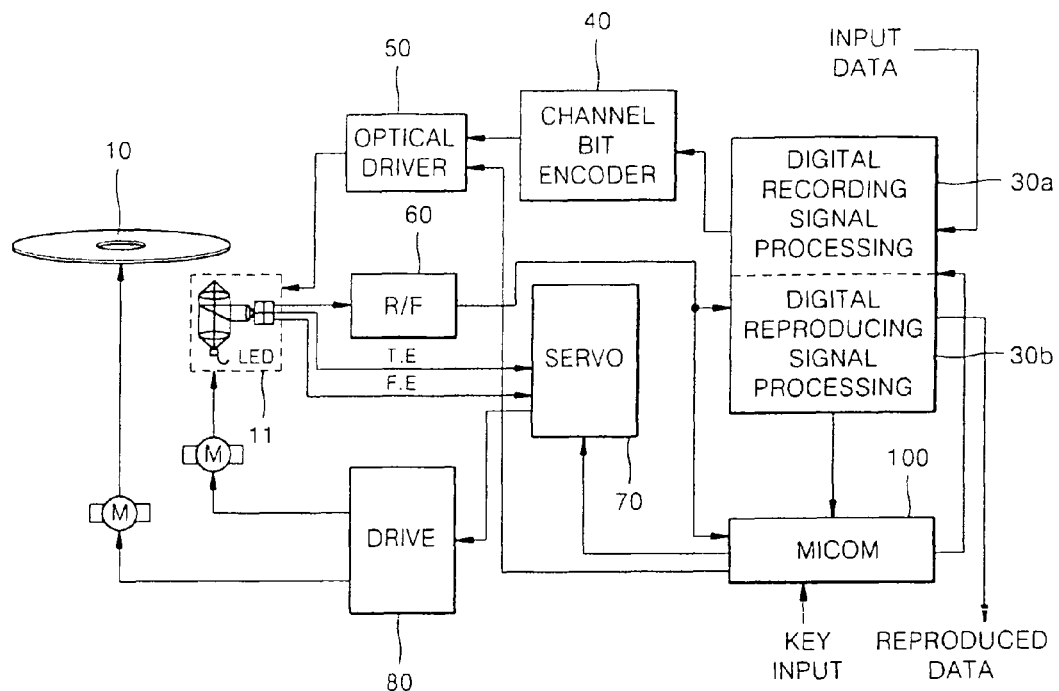
FIG. 1 is a block diagram illustrating the configuration of a general optical recording/reproducing apparatus.
Figure 2:
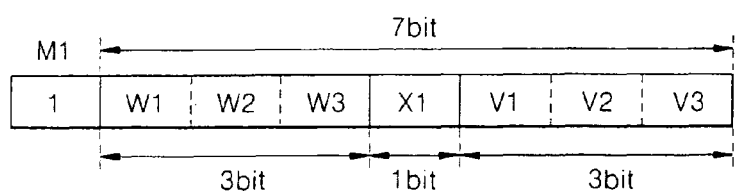
FIG. 2 is a diagram illustrating the data format for a reference power value recorded on a re-writable optical recording medium.
Figure 3:
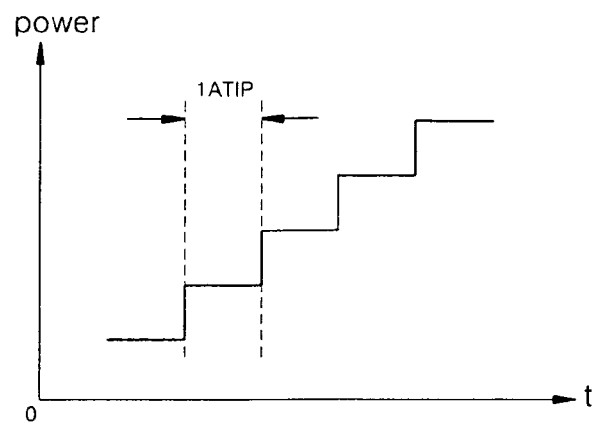
FIG. 3 is a graph illustrating a variation in optical power with reference to a target recording power value in the recording of test data.
Figure 4:
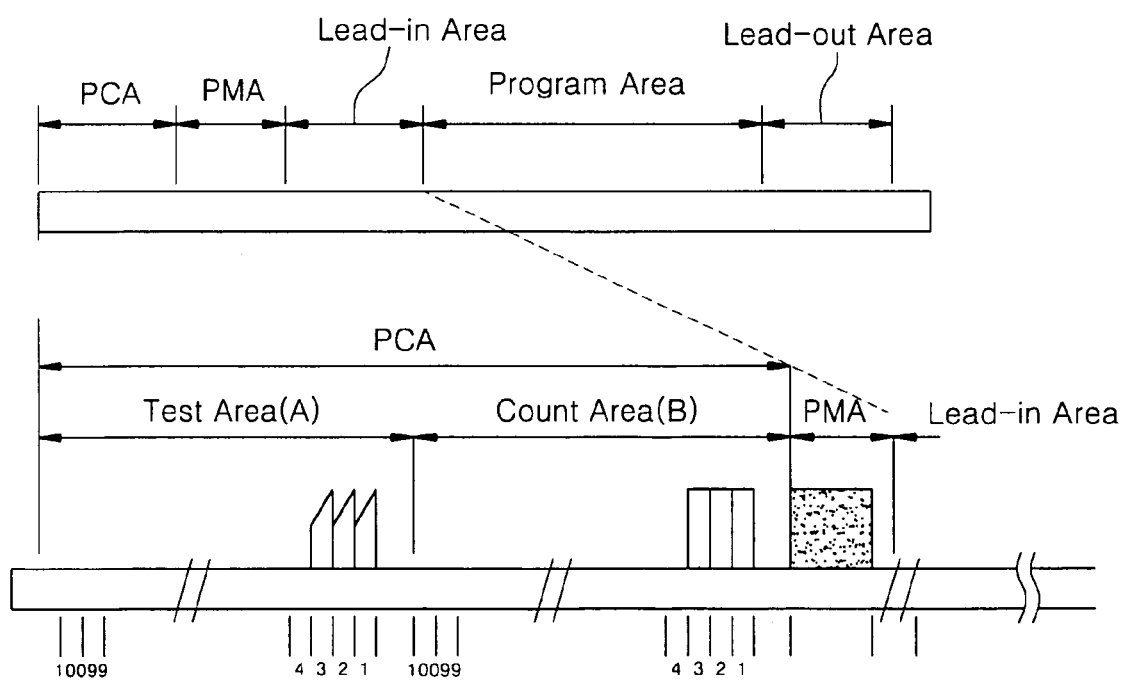
FIG. 4 is a view illustrating a recording signal test area A in a re-writable optical recording medium, along with a count area B for recording the number of test times.

In FIG. 8, constituting elements respectively corresponding to those in FIG. 1 are denoted by the same reference numerals.

The optimal recording apparatus of FIG. 8 is characterized by a jitter detecting unit 120. As shown in FIG. 8, the jitter detecting unit 120 includes a 3T signal detector 121 for extracting only a 3T signal component from a binary signal outputted from a R/F unit 60, and a phase difference detector 122 for synchronizing the extracted 3T signal with a channel bit clock, and detecting a phase difference between the 3T signal and a signal generated in accordance with the synchronization of the 3T signal at leading and trailing edges, respectively. The jitter detecting unit 120 also includes an integrator 123 for conducting an integration for phase differences detected by the phase difference detector 122, thereby outputting two integrated signals associated with the leading and trailing edges, respectively, and a subtractor 124 for deriving a difference between the integrated signals.

The output from the jitter detecting unit 120 is applied to a microcomputer 100 which, in turn, determines an optimum recording signal format, based on the jitter calculated by the jitter detecting unit 120.

Figure 9:
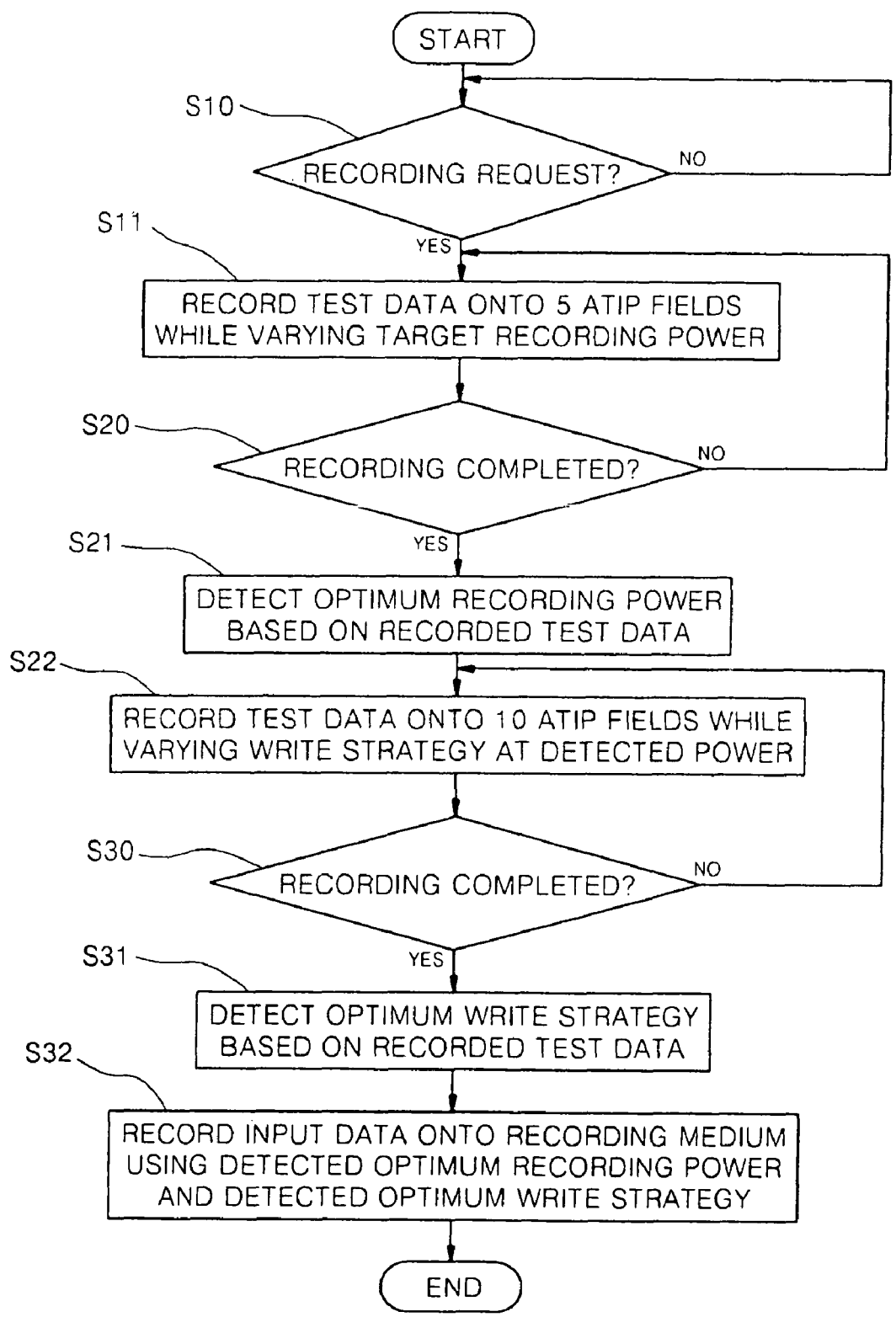
FIG. 9 is a flow chart illustrating an optimal recording method for optical recording media carried out in the optical recording/reproducing apparatus of FIG. 8 in accordance with the present invention.

FIG. 9 is a flow chart illustrating an optimal recording method for optical recording media carried out in the optical recording/reproducing apparatus of FIG. 8 in accordance with the present invention. This optimal recording method will now be described, in conjunction with the configuration of the optical recording/reproducing apparatus shown in FIG. 8.

When an optical recording medium is loaded in the optical recording/reproducing apparatus, the microcomputer 100 determines whether or not a data recording request is made (Step S10).

Where a data recording request is made, the microcomputer 100 conducts an OPC procedure.

Figure 10:
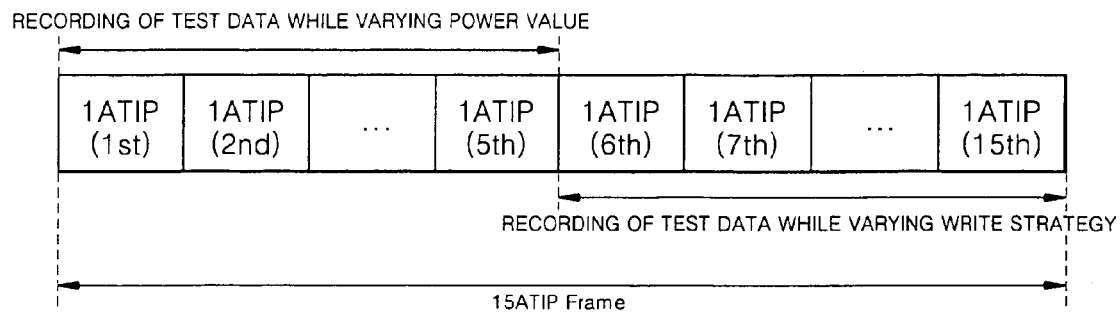
FIG. 10 is a diagram illustrating the recording of test data carried out under the condition in which a recording power and a write strategy are varied.

In accordance with the OPC procedure, the microcomputer 100 conducts a control to record test data onto the test area of the optical recording medium 10 while varying the magnitude of a target recording power read out from the optical recording medium 10 (Step S11). In this case, the recording of test data is carried out under the condition in which the variation in recording power is conducted about 5 times (for 5 ATIP fields) reduced in number, as compared to recording power variations of 10 times in the conventional method. This is shown in FIG. 10.

It is then determined whether or not the recording of test data is completed (Step S20). If the recording of test data is completed, the OPC procedure then proceeds to step S21.

Thus, the procedure of step 21 is executed in a state in which the test data is completely recorded on the test area of the optical recording medium 10 at sequentially-varying optical drive powers, respectively.

At step S21, the microcomputer 100 controls the pick-up unit 11 to read out the test data sequentially recorded about 5 times onto the PCA area of the optical recording medium 10. The microcomputer 100 then determines an optimum recording power, based on signals reproduced in accordance with the read-out procedure.

Figure 5:
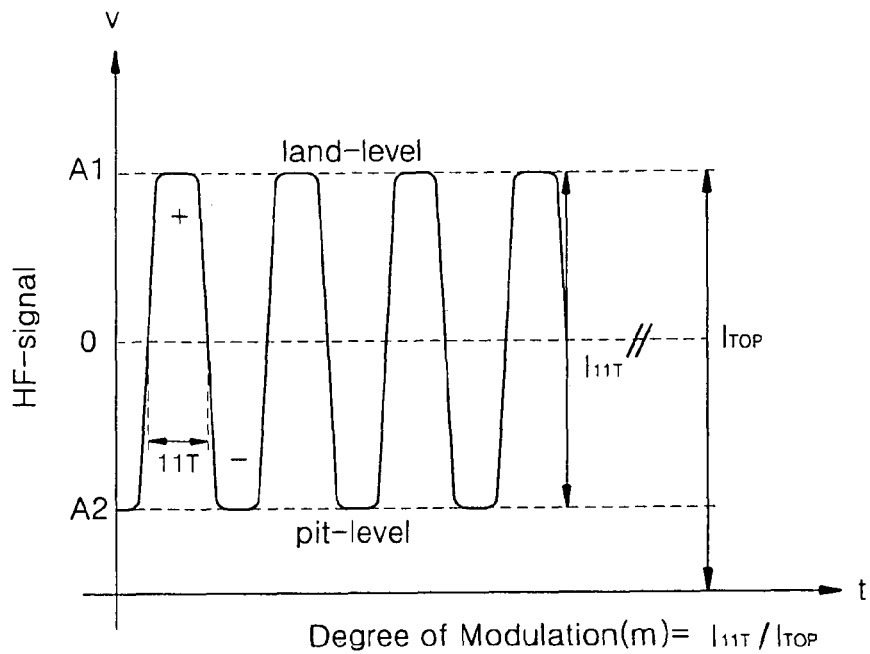
FIG. 5 is a waveform diagram illustrating a reproduced signal for the test data recorded on the optical recording medium.
Figure 6:
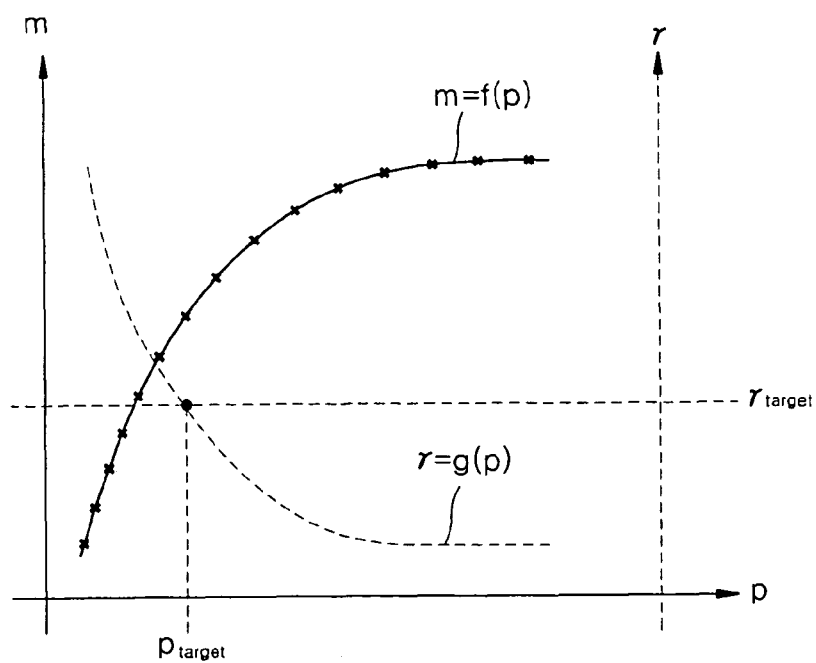
FIG. 6 is a graph depicting a modulation degree curve and a $\gamma$ curve for detecting an optimum recording power value.

If the optical recording medium 10 is a CD-RW, the microcomputer 100 derives the degree of modulation for signal characteristics from the signals of FIG. 5 sequentially reproduced and then subjected to a filtering and waveform shaping in the R/F unit 60. The modulation degree m corresponds to a value of $I_{11T}/I_{TOP}$ ($m = I_{11T}/I_{TOP}$). Here, "$I_{11T}$" represents the amplitude of the reproduced signal for an 11T signal, and "$I_{TOP}$" represents a peak value of the 11T signal.

Next, a modulation curve is derived using modulation degrees respectively derived in accordance with reproduction of the test data recorded 5 times at optical powers sequentially varied.

Figure 11:
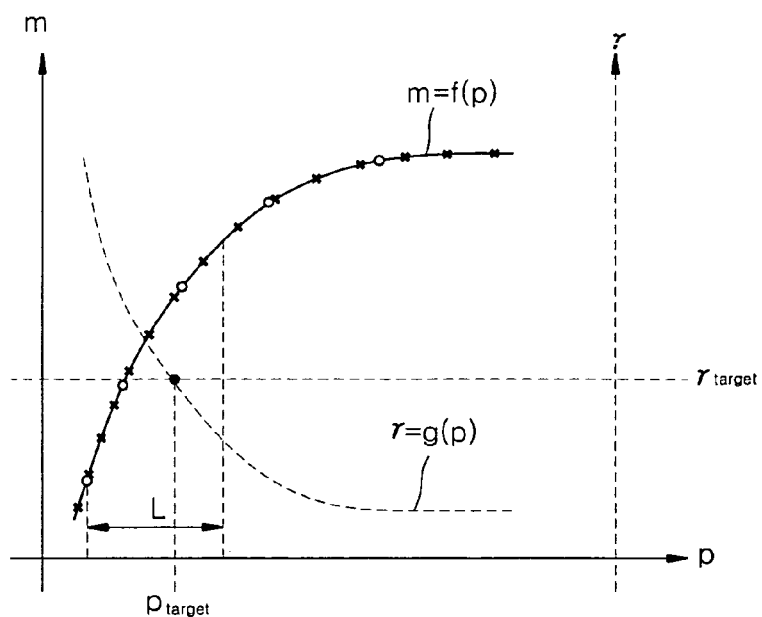
FIG. 11 is a graph illustrating a modulation degree curve and a $\gamma$ curve for detecting an optimum recording power value associated with a re-writable optical recording medium in accordance with the present invention.

FIG. 11 illustrates a modulation degree curve derived using 5 modulation degrees obtained in accordance with reproduction of test data recorded 5 times.

That is, the microcomputer 100 derives 5 two-dimensional values (p, m) for the degree of modulation, based on data recorded at an optical power for each ATIP field. Based on these 5 points, a curve filtering is conducted to derive a modulation degree curve.

Although the curve filtering is conducted using about 5 points, as mentioned above, there is little difference from the case, in which the curve filtering is conducted using an increased number of two-dimensional values (p, m). This is because the function field (the modulation degree field), in which the optimum recording power is determined, is usually a linear field.

Thus, it is possible to detect an optimum recording power even though the recording of test data is conducted for a reduced number of recording times less than the 15 recording times in the conventional case.

After a polynomial for the modulation degree curve "$m = f(p)$" connecting five points calculated in the curve filtering procedure is derived, it is stored. Thereafter, a γ curve "$\gamma = g(p)$", as shown in FIG. 11, is derived using the estimated modulation degree curve "$m = f(p)$".

The γ curve "$\gamma = g(p)$" is derived from a set of values each obtained at one position on the modulation degree curve "$m = f(p)$" and expressed by $$"\frac{p}{m} \times \frac{dm}{dp}",$$

that is, $$"\frac{p}{m} \times f(p)".$$

After the γ curve is derived, the target γ value $\gamma_{target}$ is read out which is recorded on the optical recording medium 10. The target γ value $\gamma_{target}$ is recorded in the form of data of 3 bits G1, G2, and G3 in a "Second" byte (M1:S1:F1=001) within an ATIP, that is, a time information field, recorded on the optical recording medium 10, as shown in FIG. 12.

Subsequently, a target recording power value $p_{target}$ corresponding to the read target γ value γ target is detected from the function "$\gamma = g(p)$" previously derived. In this case, the target recording power value $p_{target}$ is a power value at a point where the target γ value γ target crosses the curve "$\gamma = g(p)$", as shown in FIG. 11.

After the detection of the target recording power value $p_{target}$, an optimum recording power value is derived by multiplying the detected target recording power value $p_{target}$ by a constant ρ. The constant ρ is also recorded in the form of data of 3 bits P1, P2, and P3 in the "Second" byte shown in FIG. 12, similarly to the target γ value. Accordingly, the optimum recording power value can be derived by reading out the constant ρ, and then conducting a computation using the read constant ρ and the derived target recording power value $p_{target}$.

Meanwhile, where the optical recording medium 10 is an once-writable optical recording medium, the microcomputer 100 calculates respective reproduction signal asymmetries of the reproduction test data of FIG. 5, read out in a sequential fashion and then subjected to a filtering and a waveform shaping in the R/F unit 60, that is, values β(β=(A1+A2)/(A1−A2)).

Thereafter, the function corresponding to the curve of FIG. 13 is filtered using the derived recording power values and the derived β values respectively associated with those recording power values.

A target recording power value is then acquired from the curve derived using a reduced number of samples. Although the recording of test data is conducted only about 5 times (for 5 ATIP fields) less than the 15 recording times in the conventional case, there is no adverse effect on the detection of a target recording power value with a β value included in a target range. This is because characteristics approximate to linear characteristics are exhibited in the portion of the curve of FIG. 13 corresponding to a target range of the β value (−4% to +8%). This means that the curve estimated using a reduced number of samples has, at the linear portion thereof, little differences from the curve estimated using a complete number of samples.

Figure 7:
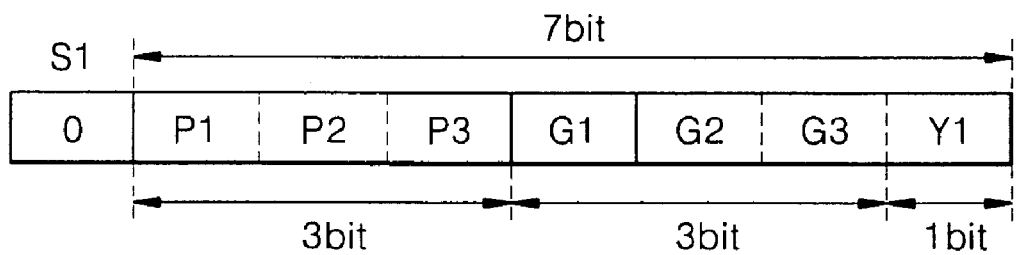
FIG. 7 is a diagram illustrating a data format for a $\beta$ value range and an optimum write strategy recorded on the optical recording medium.

After the above mentioned curve is obtained, the microcomputer reads out the target β value recorded on the optical recording medium 10. As shown in FIG. 7, the target β value is recorded in the form of data of 3 bits P1, P2, and P3 in the "Second" byte (M1:S1:F1=001) within the ATIP, that is, the time information field, recorded on the optical recording medium 10.

Where the read 3-bit data (P1, P2, P3) corresponds to "000", the microcomputer 100 determines the β value to range from −4% to +8%. On the other hand, where the read 3-bit data (P1, P2, P3) corresponds to "001", the microcomputer 100 determines the β value to range from 0% to +12%.

After determining the β range, the microcomputer 100 selects one β value from the determined β range, as an optimum recording power value.

After determining the optimum recording power value, as mentioned above, the microcomputer 100 records again test data in fields of the test area following the position, at which the recording of test data is completed. That is, the microcomputer 100 records again test data in the fields of the test area corresponding to the remaining 10 ATIPs.

This recording of test data is conducted using the detected recording power value while varying the write strategy, fixedly recorded on the optical recording medium 10, about 10 times, in accordance with the type or record speed of the optical recording medium 10 (Step S22).

The procedure of step S22 will now be described in more detail.

In accordance with the procedure of step S22, the microcomputer 100 discriminates the type of the optical recording medium 10.

Where the optical recording medium 10 is an once-writable optical recording medium, the pick-up unit 11, which serves to record test data, for the same signal, several times while varying the level or duration of recording pulses in accordance with a varying write strategy.

On the other hand, where the optical recording medium 10 is a re-writable optical recording medium, for example, a CD-RW, the pick-up unit 11 records test data while varying the duration of recording pulses.

Thus, all write strategies varied from a fixed value are stored.

The recording pulse level having an influence on a medium variation of the optical recording medium serves to vary the focusing bias of the pick-up unit 11. Accordingly, an equivalent medium variation may be obtained by varying a focusing distance. That is, in place of a variation in the peak value of recording pulses obtained by varying the optical power, a variation in the intensity of light at the recording point may be carried out by adjusting the distance between the optical recording medium and the pick-up unit maintained by the focusing servo unit, thereby allowing the laser beam emitted from the pick-up unit to be focused onto the optical recording medium in an adjusted area.

When the recording of test data onto the test area of the optical recording medium 10 for the remaining 10 ATIPs using the stored write strategies is completed (Step S30), the microcomputer 100 controls the pick-up unit 11 to sequentially read out the test data recorded on the optical recording medium 10. Subsequently, one of the write strategies exhibiting best reproduction characteristics is detected, based on signals read out and reproduced (Step S31).

For this detection, the 3T signal detector 121 included in the jitter detecting unit 129 of FIG. 8 detects most frequent 3T components from a binary signal outputted from the R/F unit 60 when test data is reproduced. The detected signal is outputted from the 3T signal detector 121 in the form of a signal indicated by "①" in FIG. 14.

Figure 14:
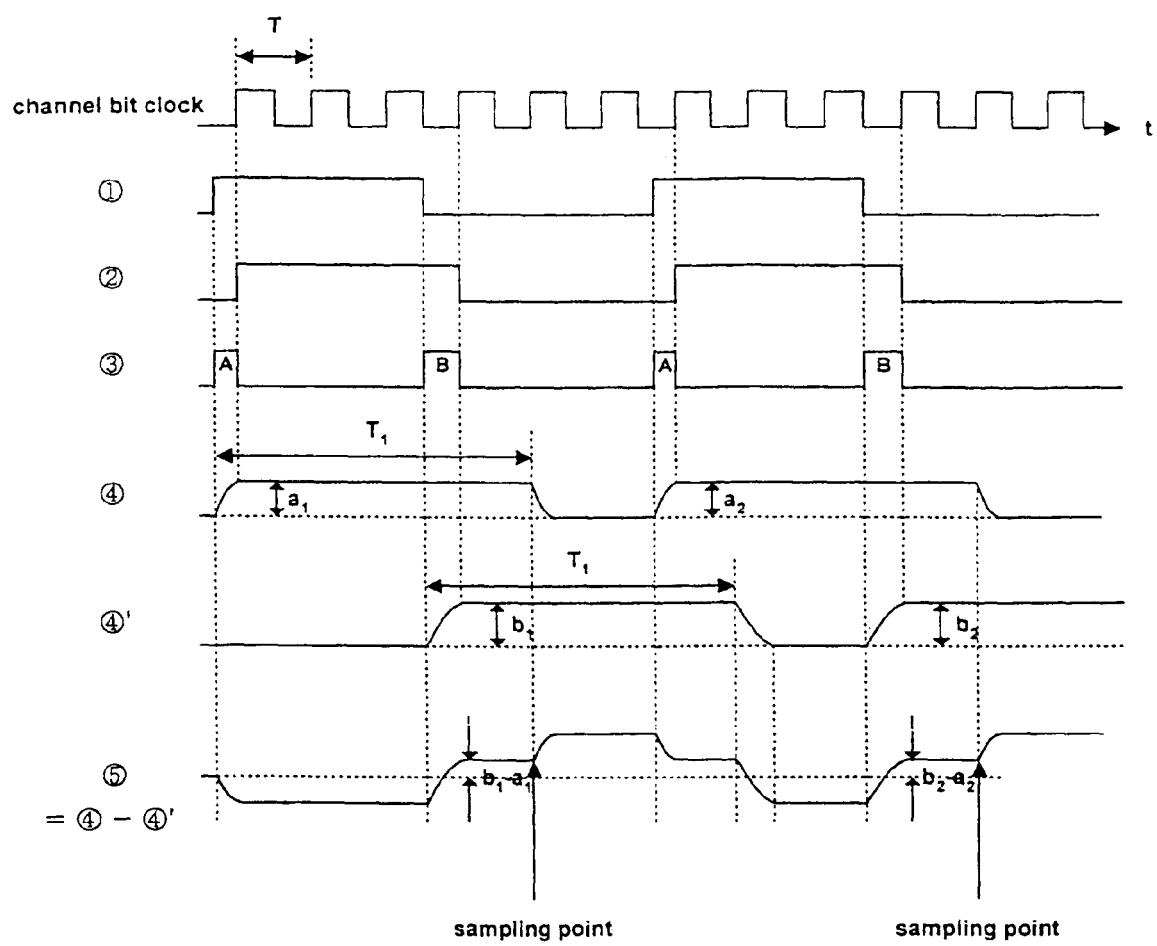
FIG. 14 is a waveform diagram illustrating output signals from a jitter detecting unit of FIG. 8.

The phase difference detector 122 receives the signal, indicated by "①" in FIG. 14, from the 3T signal detector 121, and generates a signal indicated by "②" in FIG. 14 in sync with a channel bit clock. The phase difference detector 122 then conducts an exclusive ORing operation for the signal ② with the 3T signal inputted thereto, thereby outputting a phase difference detect signal indicated by "③" in FIG. 14.

The phase difference detect signal ③ is applied to the integrator 123 which, in turn, integrates the phase difference detect signal ③ for respective components A and B thereof to maintain a predetermined period of time $T_1(4T<T_1<6T)$, thereby outputting signals respectively indicated by "④" and "④'" in FIG. 14.

The integrated signals are applied to the subtractor 124 which, in turn, outputs a signal indicative of a difference between the integrated signals ④ and ④'. This difference signal is indicated by "⑤" in FIG. 14 (⑤=④−④').

The difference signal outputted from the subtractor 124 is inputted to the microcomputer 100 which, in turn, periodically conducts a sampling operation for the difference signal at intervals of the predetermined time $T_1$. The microcomputer 100 also determines a jitter associated with each sample.

Where the signal detected by the 3T signal detector 121 has a length of just 3Ts, there is no temporal difference between the leading and trailing edges of the 3T signal synchronizing with the channel bit clock, even though there is a phase delay from the 3T signal. In this case, accordingly, the two signals A and B outputted from the phase difference detector 122 have the same pulse width. As a result, the difference signal "$b_i−a_i$" indicative of the difference between the integrated signals corresponds to "0". Thus, the jitter of the currently reproduced signal detected by the microcomputer 100 corresponds to "0".

However, where the signal detected by the 3T signal detector 121 has a length different from the length of just 3Ts, there is a temporal difference between the leading and trailing edges of the 3T or 4T signal synchronizing with the channel bit clock. In this case, accordingly, the two signals A and B outputted from the phase difference detector 122 have different pulse widths, respectively, as indicated by "③" in FIG. 14. As a result, the difference signal "$b_i-a_i$" has a value other than the value of 0. To this end, the absolute values of all difference signals "$b_i-a_i$" are summed to derive a sum "$\Sigma|b_i-a_i|$". This sum is recognized as the jitter for the reproduced signal.

As described above, the microcomputer 100 sequentially reads out and reproduces test data recorded using different write strategies while determining respective jitters of reproduced signals. Based on the determined jitters, the microcomputer 100 determines the write strategy, associated with the reproduced signal involving the smallest jitter, to be an optimum recording strategy.

After determining the optimum recording power and the optimum write strategy for the optical recording medium 10, the microcomputer 100 records data on the optical recording medium 10 using the determined optimum recording power and the determined optimum write strategy (Step S32).

As apparent from the above description, the present invention provides an optimal recording apparatus and method for optical recording media which are capable of identifying an optimum recording power and an optimum write strategy, based on the test area of an optical recording medium, thereby allowing data to be recorded on the optical recording medium using the identified optimum recording power and the identified optimum write strategy. Accordingly, it is possible to record data under an optimum recording condition capable of minimizing the jitters of reproduced signals. Thus, the present invention achieves an acquisition of data exhibiting superior reproduction characteristics when recorded data is reproduced.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optimal recording method for optical recording media comprising the steps of:
   (a) recording test data onto a desired area of an optical recording medium while varying respective values of at least two factors, each factor having an influence on data recording characteristics of the optical recording medium when data is recorded on the optical recording medium;
   (b) reproducing the test data respectively recorded at the varied values of the factors; and
   (c) determining values of the factors involving an optimum recording condition, based on reproduction characteristics of the reproduced test data,
   wherein the factor values comprise a recording power value and a characteristic value of recording pulses associated with a recording pulse signal of a recording format, and
   wherein a variation of the recording pulse signal in the variation of the factors is carried out by varying a focusing distance between the optical recording medium and an optical pick-up used in association with the optical recording medium.

2. The optimal recording method according to claim 1, further comprising the step of:
   recording input data onto the optical recording medium using the determined factor values involving the optimum recording condition.

3. An optimal recording method for optical recording media comprising:
   a first test data recording step of recording test data onto a portion of a test area in an optical recording medium while varying the value of a first factor having an influence on data recording characteristics of the optical recording medium when data is recorded on the optical recording medium; and
   a second test data recording step of recording test data onto the remaining portion of the test area while varying the value of a second factor including a format of a recording signal having an influence on the data recording characteristics of the optical recording medium when data is recorded on the optical recording medium,
   wherein the second factor value is associated with characteristics of recording pulses, and
   wherein a variation of the recording pulse signal in the variation of the factors is carried out by varying a focusing distance between the optical recording medium and an optical pick-up used in association with the optical recording medium.

4. The optimal recording method according to claim 3, wherein the second recording step comprises the steps of:
   reproducing the test data recorded at the first test data recording step, thereby determining the first factor values used at the first test data recording step; and
   recording test data onto the remaining portion of the test area while varying the second factor value at each of the determined first factor values.

5. The optimal recording method according to claim 4, further comprising the steps of:
   reproducing the test data recorded at the second test data recording step, thereby detecting respective jitters of the resultant reproduced signals; and
   determining an optimum one of the second factor values, based on the detected jitters.

6. An optimal recording method for optical recording media comprising:
   a first test data recording step of recording test data onto a portion of a test area in an optical recording medium while varying the value of a first factor having an influence on data recording characteristics of the optical recording medium when data is recorded on the optical recording medium;
   a second test data recording step of recording test data onto the remaining portion of the test area while varying the value of a second factor having an influence on the data recording characteristics of the optical recording medium when data is to be recorded on the optical recording medium;
   reproducing the test data recorded at the first test data recording step, thereby determining the first factor values used at the first test data recording step;
   recording test data onto the remaining portion of the test area while varying the second factor value at each of the determined first factor values;
   reproducing the test data recorded at the second test data recording step, thereby detecting respective jitters of the resultant reproduced signals;

determining an optimum one of the second factor values, based on the detected jitters;

extracting a variation in component length from each of the reproduced signals; and detecting the jitter of the reproduced signal, based on the extracted variation.

7. The optimal recording method according to claim 3, wherein the first factor value is associated with an optimum recording power.

8. The optimal recording method according to claim 3, wherein when the second factor value is associated with characteristics of recording pulses, the variation of the second factor value is carried out by varying a level of the recording pulses used to record data for the same signal or varying a width of the recording pulses used to record data for the same signal.

9. The optimal recording method according to claim 3, further comprising:

reproducing the test data recorded at the second test data recording step using an optimum recording power value used at the first test data recording step, thereby detecting respective jitters of the resultant reproduced signals; and determining an optimum one of the second factor values, based on the detected jitters, wherein the jitter detecting step comprises extracting a variation in a predetermined component length from each of the reproduced signals, and detecting the jitter of the reproduced signal, based on the extracted variation.

10. The optimal recording method according to claim 6, wherein the variation in 3T component length from each of the reproduced signals is extracted.

11. An optimal recording method for optical recording media comprising:

a first test data recording step of recording test data onto a portion of a test area in an optical recording medium while varying the value of a first factor having an influence on data recording characteristics of the optical recording medium when data is recorded on the optical recording medium;

a second test data recording step of recording test data onto the remaining portion of the test area while varying the value of a second factor including a format of a recording signal having an influence on the data recording characteristics of the optical recording medium when data is to be recorded on the optical recording medium;

reproducing the test data recorded at the second test data recording step using an optimum recording power value used at the first test data recording step, thereby detecting respective jitters of the resultant reproduced signals; and determining an optimum one of the second factor values, based on the detected jitters, wherein the jitter detecting step comprises extracting a variation in a predetermined component length from each of the reproduced signals, and detecting the jitter of the reproduced signal, based on the extracted variation.

* * * * *